US011374737B2

(12) United States Patent
Song et al.

(10) Patent No.: US 11,374,737 B2
(45) Date of Patent: Jun. 28, 2022

(54) METHOD OF RESPONSE SIGNAL PROCESSING IN TRACTION POWER NETWORKS

(71) Applicant: Nanjing Institute of Railway Technology, Nanjing (CN)

(72) Inventors: Qihou Song, Changzhou (CN); Honggao Feng, Changzhou (CN); Baichuan Xu, Changzhou (CN)

(73) Assignee: Nanjing Institute of Railway Technology, Nanjing (CN)

( * ) Notice: Subject to any disclaimer, the term of this patent is extended or adjusted under 35 U.S.C. 154(b) by 327 days.

(21) Appl. No.: 16/706,807

(22) Filed: Dec. 8, 2019

(65) Prior Publication Data

US 2020/0403773 A1     Dec. 24, 2020

(30) Foreign Application Priority Data

Jun. 20, 2019    (CN) .......................... 2019105360434

(51) Int. Cl.
  *H04L 9/14*       (2006.01)
  *H04L 9/06*       (2006.01)
  (Continued)

(52) U.S. Cl.
  CPC .............. *H04L 9/0625* (2013.01); *H04L 9/14* (2013.01); *H04L 9/16* (2013.01); *H04L 63/045* (2013.01);
  (Continued)

(58) Field of Classification Search
  CPC ......... H04L 9/14; H04L 9/16; H04L 63/0428; H04L 9/0618; H04L 2209/80; H04L 63/045
  See application file for complete search history.

(56) References Cited

U.S. PATENT DOCUMENTS 4,972,474 A * 11/1990 Sabin .................... H04L 9/0662
                                                                     380/46
10,477,431 B2 * 11/2019 Wang ................... H04B 17/336
(Continued)

FOREIGN PATENT DOCUMENTS

CN       206920900 U  *  1/2018   ......... H04L 12/4641

OTHER PUBLICATIONS

X. Di, Y. Wang, J. Li, L. Cong, H. Qi and Y. Zhang, "An optimized video selective encryption algorithm," 2017 10th International Congress on Image and Signal Processing, BioMedical Engineering and Informatics (CISP-BMEI), 2017, pp. 1-5, doi: 10.1109/CISP-BMEI.2017.8301932. (Year: 2017).*

(Continued)

*Primary Examiner* — Jeffery L Williams
*Assistant Examiner* — Zhimei Zhu
(74) *Attorney, Agent, or Firm* — Idea Intellectual Limited; Margaret A. Burke; Sam T. Yip

(57) ABSTRACT

A method of response signal processing applied in traction power networks, comprising establishing an data transmission channel between a target and a backend terminal through a relay router in a power distribution room; delivering a temperature-humidity information to the backend terminal by the target through the data transmission channel, and a response signal being delivered to the relay router; the relay router determining a second signal to noise ratio (SNR) according to a first SNR of the data transmission channel responded from the target when a noise ratio (NR) adjusting requirement is satisfied; the relay router determining a first identification of encryption algorithm based on the second SNR, and transmitting the first identification of encryption algorithm to the target. The present invention avoids the needs for retransmitting encrypted response signals for (Continued)

several times during transmission between the backend terminal and the charging controller.

11 Claims, 1 Drawing Sheet

(51) Int. Cl.
    *H04L 9/16*         (2006.01)
    *H04L 9/40*         (2022.01)

(52) U.S. Cl.
    CPC ........ *H04L 9/0618* (2013.01); *H04L 63/0428* (2013.01); *H04L 2209/80* (2013.01)

(56) References Cited

U.S. PATENT DOCUMENTS

2007/0217373 A1*   9/2007   Kotzin ................... H04L 1/0631
                                                                        370/338
2018/0139191 A1*   5/2018   Shi ............................ H04L 9/06

OTHER PUBLICATIONS

Kordov, Krasimir. "A Novel Audio Encryption Algorithm with Permutation-Substitution Architecture." Published May 11, 2019, Electronics, vol. 8 Issue 5, 530; https://doi.org/10.3390/electronics8050530 (Year: 2019).*

* cited by examiner

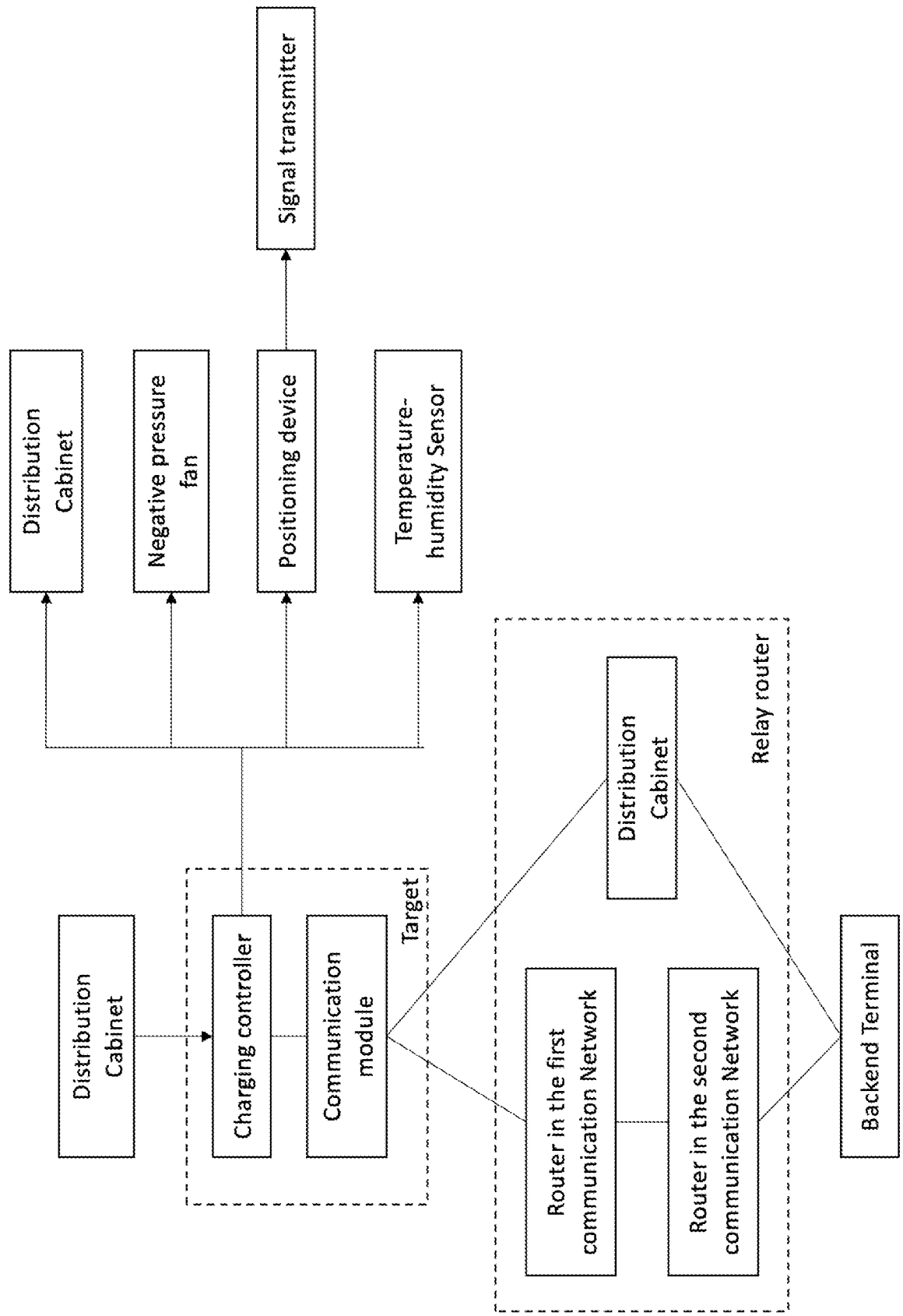

METHOD OF RESPONSE SIGNAL PROCESSING IN TRACTION POWER NETWORKS

CROSS-REFERENCE TO RELATED APPLICATIONS

This application claims priority to China Patent Application No. 201910536043.4, filed on Jun. 20, 2019; the disclosure of which is incorporated by reference herein in its entirety.

FIELD OF THE INVENTION

The present invention relates to traction power networks, more particularly to methods of response signal processing applied in traction power networks.

BACKGROUND OF THE INVENTION

In railway, a power distribution room for emergency power supply has a negative pressure fan, a positioning device and a temperature-humidity sensor. The negative pressure fan is able to accelerate the air flow in the power distribution room and to prevent components in the power distribution room from being rusted due to the slow air flow inside the power distribution room. The positioning device should be convenient for the staff to identify the location of the power distribution room in time during emergency power supply to the railway which is to ensure the functionality of supplying emergency power. The temperature-humidity sensor should be convenient for the maintenance personnel to monitor the temperature and humidity of the power distribution room which helps the maintenance personnel timely maintains the power distribution room. Such configuration for the power distribution room is simple and easy to operate, and the performance in use is better than the traditional way.

At present, the easy way for the backend terminal to acknowledge the acquisition of the temperature and humidity of the power distribution room is to transmit a response signal to the charging controller. However, the size of the response signal to the temperature-humidity information of the power distribution room is relatively small, the response signal is often interfered by noise during the transmission, which makes the transmission of the response signal unstable. More specifically, for security concerns, the interference caused by signal noise results in high probability of error codes during the decryption of the encrypted response signal. Accordingly, the communication network is to transmit an encrypted response signal again to indicate the error code. In this way, some encrypted response signals have to be transmitted for several times, which results in weakening the stability of signal delivery. Therefore, such transmission increases the delay of signal delivery in the communication network and leads to a slow transmission speed for the delivery of the response signal.

SUMMARY OF THE INVENTION

Some aspects of embodiments of the present invention are outlined and briefly introduced herein below with some preferred embodiments. Some simplification or omission to the abstract and title may be made in order to avoid blurring to the description, abstract and title. However, such simplification or omission is not used to limit the invention scope.

In view of aforementioned shortcoming in the prior art, the present invention is proposed.

According to one objection of the present invention, a method of response signal processing applied in traction power networks is provided. The method effectively avoids the needs of the current existing art that have to retransmit the encrypted response signals for several times during transmission between the backend terminal and the charging controller. Signal retransmission increases the delay of signal delivery in the communication network, which leads to the shortcoming of low transmission speed in the delivery of response signal.

The preferred embodiment of the present invention comprises: the relay router of the present invention receives a response signal from the backend terminal which is going to transmit to a target, and the relay router determines a second signal to noise ratio (SNR) according to the first SNR of the data transmission channel responded from the target, when a noise ratio (NR) adjusting requirement is satisfied; the encrypted level of encryption algorithm corresponded to the second SNR is lower than the encryption level of encryption algorithm corresponded to the first SNR; the operational state of software and hardware of the relay router for the currently held data transmission channel is no higher than a loading restraint, and the first SNR is in a predetermined range; the relay router determines a first identification of encryption algorithm based on the second SNR, and transmits the first identification of encryption algorithm to the target; the relay router transmits an encrypted response signal to the target, which is encrypted based on the encryption algorithm according to the first identification of encryption algorithm; and because the encrypted level of encryption algorithm corresponded to the second SNR is lower than the encrypted level of encryption algorithm corresponded to the first SNR, and the encrypted response signal by an encryption algorithm with smaller encrypted level is able to have better security and noise resistance performance during the transmission. In this manner, the number of retransmissions for the response signals can be reduced, and thus reducing the delay of transmitting the response signal which improves the transmission performance.

BRIEF DESCRIPTION OF THE DRAWINGS

Embodiments of the invention are described in more detail hereinafter with reference to the drawings, in which:

FIG. 1 schematically depicts an embodiment of the present invention applied to a traction power network.

DETAILED DESCRIPTION

With reference to FIG. 1, FIG. 1 illustrates an embodiment of the present invention. This embodiment provides a traction power network, which comprises a power distribution room for railway emergency power supply. The power distribution room comprises a housing body, a door, a negative pressure fan, a positioning device and a temperature-humidity sensor. A roof protector is mounted on the outer surface of the top of the housing body, and the digital display screen, the ventilation window and cable pipe are mounted on the outer surface of a side of the housing body. A charging controller and a distribution cabinet is mounted inside the power distribution room, and the distribution cabinet is fixedly installed on a side of the charging controller. The negative pressure fan is installed on the outer surface of a side of the roof protector. A positioner is mounted between the positioning device and the roof protector, and the positioning device is mounted on the front outer surface of the roof protector through the positioner. The temperature-humidity sensor is mounted on the outer surface of a rear side of the door through a soldering layer. A signal transmitter is mounted on the outer surface of the top of the positioning device. The output of the distribution cabinet is connected to the input of the charging controller. The output of the charging controller is electrically connected to the inputs of the digital display screen, negative pressure fan, positioning device and the temperature-humidity sensor. The output of the positioning device is electrically connected to the input of the signal transmitter. Inside the temperature-humidity sensor, there are a temperature sensing component and a humidity sensing component. The humidity sensing component is mounted on a side of the temperature sensing component.

The aforesaid charging controller further establishes a data transmission channel between the backend terminal through the relay router. In this manner, the temperature-humidity information from the charging controller is able to store and backup in the backend terminal through the relay router, which realizes the remote monitoring.

Specifically, the connection between the charging controller and the backend terminal has the following two connection modes.

The first connection mode of the charging controller and the backend terminal: the charging controller is connected to a communication module (e.g., the third-generation (3G) or the fourth-generation (4G) communication module), and the communication module is connected to the router of the communication network (e.g., 3G or 4G communication network). The router of the communication network is connected to the backend terminal. The backend terminal may be a computer or a notebook computer, which allows establishing communication with the charging controller in the communication network. The charging module and the communication module are soldered onto a single PCB substrate. The router in the communication network is used as a relay router, the charging controller establishes an data transmission channel with the router in the communication network, and thus the data transmission channel is established between the router of the communication network and the backend terminal.

The second connection mode of the charging controller and the backend terminal: the charging controller establishes an data transmission channel among routers in the first communication network. The routers in the first communication network and the routers in the second communication network establish an data transmission channel. The backend terminal establishes an data transmission channel with the second transmittal channel. The routers in the first communication network and the second communication network can be a relay router.

The power distribution room for emergency power supply, through the negative pressure fan, is able to accelerate the air flow in the power distribution room and to prevent components in the power distribution room from being rusted due to the slow air flow inside the power distribution room. The positioning device is convenient for the staff to identify the location of the power distribution room in time during emergency power supply to the railway which is to ensure the functionality of supplying emergency power. The temperature-humidity sensor is convenient for the maintenance personnel to monitor the temperature and humidity of the power distribution room which helps the maintenance personnel timely maintains the power distribution room. Whole configuration for the power distribution room is simple. Specifically, the temperature and humidity information in the power distribution room is transmitted to the charging controller. The charging controller then transmits the received temperature and humidity information for the digital display screen for display. The charging controller may be a single chip microprocessor, PLC controller, ARM processor or FPGA processor. In this manner, the maintenance personnel can observe the temperature and humidity of the power distribution room from the digital display screen for maintenance.

A method of response signal processing applied in traction power network of the present invention comprises following steps:

Step 1: establishing an data transmission channel between the target and the backend terminal; the target includes a charging controller disposed in the power distribution room, and a communication module connected to the charging controller; the charging controller establish the connection with the relay router through the communication module. The relay router performs the relay function during the transmission of a response signal between the charging controller and the backend terminal.

Step 2: as the temperature and humidity information of the power distribution room is transmitting to the backend terminal from the charging controller, the charging controller transmits the temperature and humidity information of the power distribution room to the backend terminal through the data transmission channel via the communication module; the backend terminal stores and shows the temperature and humidity information on the screen of the backend terminal when the backend terminal had received the temperature and humidity information. In this manner, the temperature and humidity information of the power distribution room that transmitted to the charging controller is able to achieve backup and remote monitoring purpose. The backend terminal further transmits a response signal as a feedback signal to the charging controller indicating the temperature and humidity information is well received.

Accordingly, there are two connection modes to the charging controller and the backend terminal:

The first connection mode of the charging controller and the backend terminal: when the backend terminal transmits a response signal to the charging controller, the backend terminal transmits the response signal to the router in the communication network through an data transmission channel that is established between the backend terminal and the router in the communication network. The router in the communication network is then transmitting the response signal to the charging controller through an data transmission channel that is established between the router in the communication network and the charging controller. In this way, the router in the communication network can transmit the response signal to the charging controller.

The second connection mode of the charging controller and the backend terminal: when the backend terminal transmits a response signal to the charging controller, the response signal is transmitted to the router in the second communication network through an data transmission channel that is established between the backend terminal and the router in the second communication network. The router in the second communication network transmits the response signal to the charging controller sequentially through an data transmission channel (established between routers in the first communication network and the second communication network) and another data transmission channel (established between the charging controller and the first communication network). In this way, the router in the second communication network can transmit the response signal to the router in the first communication network.

Accordingly, the channel used for transmission among the charging controller, routers in the communication networks and backend terminal is called data transmission channel. The data transmission channel comprises channels for temperature-humidity information and response signal transmission.

In step 2, the acts of transmitting the response signal from the backend terminal to the charging controller comprising:
Step 2.1: the backend terminal transmits a response signal to the relay router for the target, and the router is able to receive the response signal from the backend terminal;
Step 2.2: the relay router determines a second SNR based according to a first SNR of the data transmission channel responded from the target when a NR adjusting requirement is satisfied.

The NR adjusting requirement includes: the operational state of software and hardware of the relay router for the currently held data transmission channel is no higher than a loading restraint, and the first SNR is in a predetermined range.

The loading restraint is a predetermined ratio, smaller than the loading restraint indicates the data transmission channel of software and hardware is more sufficient to be used by the relay router.

The setting of the loading restraint corresponds to the mean value of the loading performance of the relay router. If the mean value of the loading performance of the relay router is not low, the loading restraint should set higher, otherwise the transmission of response signal will become difficult; if the mean value of the loading performance of the relay router is not high, the loading restraint should set smaller, so as to prevent the use of this method from effecting adverse factors to the relay router currently having interactions with other devices.

The predetermined range comprises at least one SNR range. If the first SNR of the data transmission channel responded by the target is in the predetermined range, it means the security performance of the encryption algorithm can be improved when encryption algorithm is smaller than the encrypted level of the encryption algorithm corresponded to the first SNR; the detailed setting is depended on the desired user needs. If the predetermined range is set too high, it will lower the whole encrypted level during transmission, and makes occupancy of the hardware and software for data transmission channel being too low; if the predetermined range is set to low, the delivery of the response signal will not easy be operated.

The operational state of software and hardware for the data transmission channel include bandwidth of the data transmission channel, the memory occupancy of the relay router and number of devices connected to the relay router.

The weight value of the target is predetermined. In detail, the targets can be distinguished with different identification codes; it can also set all the target to a high weighted target, or all target to a low weighted target which is determined according to user's specific needs. The high weighted and the low weighted target are divided by the weight size. The low weighted target has a weight value lower than a threshold, and the weight value of the high weighted target is higher than the threshold.

In step 2.2, the configuration of the first SNR of the data transmission channel responded by the target is: the first SNR through the communication module of the target is inspected by the SNR from the data transmission channel between the target and the relay router. The communication module of the target may be a 3G communication module or a 4G communication module. In other words, the communication module connected to the charging controller is inspecting the data transmission channel of between the target (communication or charging controller) and the relay router. The first SNR is obtained after inspection. After that, the communication module will transmit the first SNR directly to the relay router, or transmit to the relay router first, and then delivers the first SNR to the relay router through the charging controller.

In the current disclosure, the encrypted level of encryption algorithm corresponded to the second SNR is lower than the encrypted level of encryption algorithm corresponded to the first SNR. The encryption level and the encryption algorithm are corresponded in the present invention. if the encryption algorithm is International Data Encryption Algorithm (IDEA), the encrypted level is 1; if the encryption algorithm is Triple Data Encryption Algorithm (3DES), the encrypted level is 3; and if the encryption algorithm is Tiny Encryption Algorithm (TEA), the encrypted level is 5. Such different encryption algorithm has different attributes. Smaller encrypted level may increase the computation and makes it more complex, but it provides better security. On the contrary, high encrypted level provide more efficient performance but has relatively lower security. Therefore, reducing the encryption level is able to ensure the security in data transmission.

In an embodiment of the present invention, the encrypted level corresponded to the second SNR is at least 1 level lower than the encrypted level corresponded to the first SNR. The encrypted level corresponded to the second SNR is two levels lower than the encrypted level corresponded to the first SNR, when the encrypted level of the first SNR is 5. That is to say, the encryption level of the encryption algorithm corresponding to the second SNR is 1.

In an embodiment of the present invention, the SNR, encryption algorithm and the encrypted level have following relationships: the corresponding encrypted level is 1, when the SNR being smaller than 10 dB, and the corresponded encryption algorithm is IDEA; the corresponding encrypted level is 1, when the SNR being no less than 10 dB but smaller than 15 dB, and the corresponded encryption algorithm is IDEA; the corresponding encrypted level is 1, when the SNR is no less than 15 dB but smaller than 20 dB, and the corresponded encryption algorithm is IDEA; the corresponding encrypted level is 1, when the SNR is no less than 20 dB but smaller than 25 dB, and the corresponded encryption algorithm is IDEA; the corresponding encrypted level is 1, when the SNR is no less than 25 dB but smaller than 30 dB, and the corresponded encryption algorithm is IDEA; the corresponding encrypted level is 1, when the SNR is no less than 30 dB but smaller than 35 dB, and the corresponded encryption algorithm is IDEA; the corresponding encrypted level is 3, when the SNR is no less than 35 dB but smaller than 40 dB, and the corresponded encryption algorithm is 3DES; the corresponding encrypted level is 3, when the SNR is no less than 40 dB but smaller than 45 dB, and the corresponded encryption algorithm is 3DES; the corresponding encrypted level is 5, when the SNR is no less than 45 dB but smaller than 50 dB, and the corresponded encryption algorithm is TEA; the corresponding encrypted level is 5, when the SNR is no less than 50 dB but smaller than 55 dB, and the corresponded encryption algorithm is TEA; the corresponding encrypted level is 5, when the SNR is no less than 55 dB but smaller than 60 dB, and the corresponded encryption algorithm is TEA; the corresponding encrypted level is 5, when the SNR is no less than 60 dB but smaller than 65 dB, and the corresponded encryption algorithm is TEA; the corresponding encrypted level is 5, when the SNR is no less than 65 dB but smaller than 70 dB, and the corresponded encryption algorithm is TEA; and the corresponding encrypted level is 5, when the SNR is no less than 70 dB, and the corresponded encryption algorithm is TEA.

For example, if the first SNR of the data transmission channel responded by the target is 63, the encrypted level of the encryption algorithm is 5 corresponded to 63 dB SNR. Accordingly, the corresponding encrypted level for the second SNR is determined lower than 5, the value of the second SNR can be any value to be selected in categories that SNR is less than 45 dB.

In order to improve the security of transmitting the response signal, the value for the second SRN can be any value selected from a range between 35 dB to 45 db, which ensures the encrypted level of the encryption algorithm corresponded to the second SNR is 1 level lower than the encrypted level of the encryption algorithm corresponded to the first SNR.

In order to ensure the security of response signal transmission and without reducing the bit rate for the response signal. The second SNR is 44 dB, so that the second SNR is a value close the upper limit of the corresponding encryption algorithm category which is one level lower than the encrypted level of the first SNR.

In step 2.3: the relay router determines a first identification of the encryption algorithm based on the second SNR.

The act of step 2.3 is transmitting the first identification of the encryption algorithm to the target, so that the target is able to decrypt the encrypted response signal with corresponding decryption algorithm according to the first identification of the encryption algorithm. The first identification of the encryption algorithm for IDEA is aaa, the first identification of the encryption algorithm for 3DES is bbb, and the first identification of the encryption algorithm for TEA is ccc.

In step 2.4: the relay router transmits an encrypted response signal to the target, which is encrypted based on the encryption algorithm according to the first identification of encryption algorithm, and the target decrypting the response signal by a corresponded decryption algorithm according to the first identification of encryption algorithm.

According to the aforesaid delivery of the response signal, the relay router receives the response signal to be delivered to the target through the backend terminal, the relay router determines a second SNR according to a first SNR of the data transmission channel responded from the target when a NR adjusting requirement is satisfied. The encrypted level of the encryption algorithm corresponded to the second SNR is lower than the encrypted level of the encryption algorithm corresponded to the first SNR. The NR adjusting requirement required the operational state of software and hardware of the relay router for the currently held data transmission channel is no higher than a loading restraint, and the first SNR is in a predetermined range. The relay router determines the first identification of the encryption algorithm based on the second SNR, and transmits the first identification of the encryption algorithm to the target. Because the determined second SNR has less encrypted level of the encryption algorithm compared to the encrypted level of the encryption algorithm corresponded to the first SNR, the encrypted response signal by an encryption algorithm with smaller encrypted level is able to have better security and noise resistance performance during the transmission. In this manner, the number of retransmissions for the response signals can be reduced, and thus reducing the delay of transmitting the response signal which improves the transmission performance.

Further, in step 2, transmitting the response signal to the charging controller from the backend terminal further comprises acts of: Step 2.5: the operational state of software and hardware of the relay router for the currently held data transmission channel is higher than a loading restraint, a weight value of the target is lower than a threshold, or the first SNR is not in a predetermined range, the second identification of the encryption algorithm is determined based on the first SNR responded from the target; Step 2.6: the second identification of the encryption algorithm is delivered to the target, and the second identification of the encryption algorithm is the encryption algorithm other than the encryption algorithm represented by the first identification of the encryption algorithm; and Step 2.7: an encrypted response signal is delivered to the target which is encrypted by an encryption algorithm according to the second identification encryption algorithm, and the target decrypts the response signal according to the encryption algorithm corresponded to the first identification encryption algorithm.

Moreover, the relay router comprises a central processing unit (CPU) and a flash memory connected to the CPU, and the flash memory comprises a receiving unit, an executing unit and a transmitting unit.

The receiving unit is configured for receiving a response signal from the backend terminal.

The executing unit is configured for determining a second SNR according to the first SNR of the data transmission channel responded from the target when the NR adjusting requirement is satisfied. In this embodiment, the NR adjusting requirement includes the operational state of software and hardware of the relay router for the currently held data transmission channel is no higher than a loading restraint, and the first SNR is in a predetermined range.

The executing unit further confirms the first identification of the encryption algorithm based on the second SNR.

The transmitting unit is configured to deliver the first identification of the encryption algorithm to the target.

The transmitting unit is further configured for delivering the corresponding encryption algorithm based on the first identification of the encryption algorithm to the target for encrypting the response signal. The relay router of the present invention receives a response signal from the backend terminal which is going to transmit to a target, and the relay router determines a second signal to noise ratio (SNR) according to the first SNR of a response, from the target, in the data transmission channel when a noise ratio (NR) adjusting requirement is satisfied. The encrypted level of encryption algorithm corresponded to the second SNR is lower than the encryption level of encryption algorithm corresponded to the first SNR. The operational state of software and hardware of the relay router for the currently held data transmission channel is no higher than a loading restraint, and the first SNR is in a predetermined range. The relay router determines a first identification of encryption algorithm based on the second SNR, and transmitting the first identification of encryption algorithm to the target. The relay router transmits an encrypted response signal to the target, which is encrypted based on the encryption algorithm according to the first identification of encryption algorithm. Because the encrypted level of encryption algorithm corresponded to the second SNR is lower than the encrypted level of encryption algorithm corresponded to the first SNR, and the encrypted response signal by an encryption algorithm with smaller encrypted level is able to have better security and noise resistance performance during the transmission. In this manner, the number of retransmissions for the response signals can be reduced, and thus reducing the delay of transmitting the response signal which improves the transmission performance. If the encryption algorithm is International Data Encryption Algorithm (IDEA), the encrypted level is 1; if the encryption algorithm is Triple Data Encryption Algorithm (3DES), the encrypted level is 3; and if the encryption algorithm is Tiny Encryption Algorithm (TEA), the encrypted level is 5. The encrypted level corresponded to the second SNR is at least 1 level lower than the encrypted level corresponded to the first SNR. When the encrypted level of the first SNR is 5, the encrypted level corresponded to the second SNR is two level lower than the encrypted level corresponded to the first SNR. In other words, the encrypted level of the second SNR is 1.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A method of response signal processing applied in traction power network, comprising:
   establishing a data transmission channel between a target and a backend terminal through a relay router;
   the target delivering temperature-humidity information of a power distribution room to the backend terminal through the data transmission channel, and a response signal being delivered to the relay router after the backend terminal has received the temperature-humidity information;
   the relay router determining a second signal to noise ratio (SNR) according to a first SNR of the data transmission channel transmitted from the target when a noise ratio (NR) adjusting requirement is satisfied;
   the relay router determining a first identification of an encryption algorithm based on the second SNR, and transmitting the first identification of the encryption algorithm to the target; and
   the relay router transmitting an encrypted response signal to the target, which is encrypted based on the encryption algorithm according to the first identification of the encryption algorithm, and the target decrypting the response signal by a corresponding decryption algorithm according to the first identification of the encryption algorithm.

2. The method as claimed in claim 1, wherein the target comprises a charging controller arranged in the power distribution room, and a communication module connected to the charging controller, wherein the charging controller establishes connections with the relay router via the communication module.

3. The method as claimed in claim 2, wherein the NR adjusting requirement includes
   the operational state of software and hardware of the relay router for the currently held data transmission channel being no higher than a loading restraint, and the first SNR being in a predetermined range; and a setting for the loading restraint corresponding to the mean value of a loading performance of the relay router.

4. The method as claimed in claim 3, wherein the NR adjusting requirement further includes a weight value of target which is no less than a threshold.

5. The method as claimed in claim 2, wherein an act for the target to respond to the first SNR of the data transmission channel comprises:
   inspecting the communication module connected with the charging controller to the communication module or charging controller among the data transmission channel of the relay router to obtain the first SNR; and
   the communication module sending the first SNR directly to the relay router, or the communication module sending the first SNR to the charging controller first and then delivering to the relay router through charging controller.

6. The method as claimed in claim 1, wherein an encryption level of the encryption algorithm corresponding to the second SNR is lower than an encryption level of the encryption algorithm corresponding to the first SNR;
   if the encryption algorithm is International Data Encryption Algorithm (IDEA), the encryption level is 1;
   if the encryption algorithm is Triple Data Encryption Algorithm (3DES), the encryption level is 3; and
   if the encryption algorithm is Tiny Encryption Algorithm (TEA), the encryption level is 5.

7. The method as claimed in claim 6, wherein the acts for determining the second SNR while the target is responding to the first SNR of the data transmission channel, the encryption level of the encryption algorithm corresponding to the second SNR is at least 1 level lower than the encryption level of the encryption algorithm corresponding to the first SNR; and
   the encryption level of the encryption algorithm corresponding to the second SNR is two levels lower than the encryption level of the encryption algorithm corresponding to the first SNR, when the encryption level of the first SNR is 5.

8. The method as claimed in claim 7, wherein the SNR, encryption algorithm and the encryption level have following relationships:
   the corresponding encryption level is 1, when the SNR being smaller than 10 dB, and the corresponding encryption algorithm is IDEA;
   the corresponding encryption level is 1, when the SNR being no less than 10 dB but smaller than 15 dB, and the corresponding encryption algorithm is IDEA;
   the corresponding encryption level is 1, when the SNR is no less than 15 dB but smaller than 20 dB, and the corresponding encryption algorithm is IDEA;
   the corresponding encryption level is 1, when the SNR is no less than 20 dB but smaller than 25 dB, and the corresponding encryption algorithm is IDEA;
   the corresponding encryption level is 1, when the SNR is no less than 25 dB but smaller than 30 dB, and the corresponding encryption algorithm is IDEA;
   the corresponding encryption level is 1, when the SNR is no less than 30 dB but smaller than 35 dB, and the corresponding encryption algorithm is IDEA;
   the corresponding encryption level is 3, when the SNR is no less than 35 dB but smaller than 40 dB, and the corresponding encryption algorithm is 3DES;
   the corresponding encryption level is 3, when the SNR is no less than 40 dB but smaller than 45 dB, and the corresponding encryption algorithm is 3DES;
   the corresponding encryption level is 5, when the SNR is no less than 45 dB but smaller than 50 dB, and the corresponding encryption algorithm is TEA;

the corresponding encryption level is 5, when the SNR is no less than 50 dB but smaller than 55 dB, and the corresponding encryption algorithm is TEA;

the corresponding encryption level is 5, when the SNR is no less than 55 dB but smaller than 60 dB, and the corresponding encryption algorithm is TEA;

the corresponding encryption level is 5, when the SNR is no less than 60 dB but smaller than 65 dB, and the corresponding encryption algorithm is TEA;

the corresponding encryption level is 5, when the SNR is no less than 65 dB but smaller than 70 dB, and the corresponding encryption algorithm is TEA; and the corresponding encryption level is 5, when the SNR is no less than 70 dB, and the corresponding encryption algorithm is TEA.

9. The method as claimed in claim 1, wherein the first identification of the encryption algorithm for IDEA is aaa, the first identification of the encryption algorithm for 3DES is bbb, and the first identification of the encryption algorithm for TEA is ccc.

10. The method as claimed in claim 1, further comprising that the operational state of software and hardware of the relay router for the currently held data transmission channel is higher than a loading restraint, a weight value of the target is lower than a threshold, or the first SNR is not in a predetermined range, the second identification of the encryption algorithm is determined based on the first SNR responded from the target;

the second identification of the encryption algorithm is delivered to the target, and the second identification of the encryption algorithm is the encryption algorithm other than the encryption algorithm represented by the first identification of the encryption algorithm; and an encrypted response signal is delivered to the target which is encrypted by an encryption algorithm according to the second identification encryption algorithm.

11. The method as claimed in claim 1, wherein the relay router comprises a central processing unit (CPU) and a flash memory connected to the CPU, and the flash memory comprises a receiving unit, an executing unit and a transmitting unit;

the receiving unit is configured for receiving a response signal from the backend terminal;

the executing unit is configured for determining a second SNR according to the first SNR of the data transmission channel responded from the target when the NR adjusting requirement is satisfied, and the executing unit is further used to confirm the first identification of the encryption algorithm based on the second SNR; and the transmitting unit is configured to deliver the first identification of the encryption algorithm to the target, and deliver the corresponding encryption algorithm based on the first identification of the encryption algorithm to the target for encrypting the response signal.

* * * * *